United States Patent [19]
Richards et al.

[11] 3,925,825
[45] Dec. 16, 1975

[54] SUPPORTING SYSTEM FOR ARTIFICIAL INTRAOCULAR LENS

[75] Inventors: William Richards, Medway; Bernard Grolman, Worcester, both of Mass.

[73] Assignee: American Optical Corporation, Southbridge, Mass.

[22] Filed: Jan. 24, 1975

[21] Appl. No.: 543,735

[52] U.S. Cl. .................................................. 3/13
[51] Int. Cl.² ....................... A61F 1/16; A61F 1/24
[58] Field of Search ...................... 3/13, 1; 351/160

[56] References Cited
UNITED STATES PATENTS
2,834,023  5/1958  Lieb ............................................. 3/1
3,673,616  7/1972  Fedorov et al. ............................ 3/13

OTHER PUBLICATIONS
"Intra–Ocular Acrylic Lenses After Cataract Extraction," by Harold Ridley, *The Lancet*, Jan. 19, 1952, pp. 118–121.

*Primary Examiner*—Ronald L. Frinks
*Attorney, Agent, or Firm*—H. R. Berkenstock, Jr.; William C. Nealon

[57] ABSTRACT

A lens suitable for implantation in the eye is mounted within an implantable supporting system including a rim intimately fitted about the lens edge and having laterally extending anterior and posterior iris clips affixed thereto. The lens is captured and contained within the system of the rim and clips which, in turn, comprises the haptic section of the implant.

12 Claims, 12 Drawing Figures

SUPPORTING SYSTEM FOR ARTIFICIAL INTRAOCULAR LENS

BACKGROUND OF THE INVENTION

1. Field of the Invention

This invention relates to improvements in ophthalmology and more particularly to supporting systems for artificial intraocular lenses (pseudophakoi) used for the correction of aphakia and re-establishment of binocularity in aphakia.

2. Discussion of the Prior Art

Well-fixed and well-centered intraocular lenses implants are known to produce stable retinal images with stable space localization and offer the best chance of re-establishment of binocularity in cases of aphakia.

Many techniques of lens implantation, including suturing to the ciliary muscle as disclosed in U.S. Pat. No. 3,711,870 and iris diaphragm fixation as discussed in U.S. Pat. No. 3,673,616 for example, have been used. The latter is considered to be a safe procedure giving good stability and the present invention is directed more particularly thereto.

Either the "iris clip" or the "irido-capsular" type implant may be used for iris diaphragm fixation. Each has a haptic (fastening) section comprised of posterior clips extending laterally from its optical section (the lens) and the iris clip has additional anterior clips. The clips in all cases are preferably in the form of slender rods or loops of wire or wire-like material.

Hitherto the lens to be implanted was required to be drilled, grooved or otherwise specially modified for anchoring of the clips. All such operations, in addition to being tedious, time consuming and costly to perform require particular skills, i.e. those of the glass working artisan when ceramic lenses are involved and those of the plastic working artisan when cast or molded plastic lenses are used. In addition, the inherent problems of securely anchoring prior art iris clips without breakage of the lens or producing undue stress, strain or weakening in the material of the drilled, grooved or otherwise modified lens has lead to high scrap yield and less than optimum assurance of faultlessness of structure and/or ultimate function of the implantable product.

Accordingly, it is an object of the present invention to overcome the need for drilling, grooving or otherwise modifying the optical sections (plastic or ceramic lenses) of iris diaphragm fixation pseudophakoi and to provide simple and inexpensive readily implantable structures of exceptional structural integrity and functional dependability.

SUMMARY OF THE INVENTION

The aforesaid objective and its corollaries are accomplished through the provision of a supporting system for an artificial intraocular lens (pseudophakos) including a lens rim fitted intimately about the lens edge and from which a number of iris clips are extended laterally anteriorly and/or posteriorly of the lens. The clips, being in the form of loops and/or rods of thin wire or wire-like material are each proximally secured to the lens rim, not directly to the lens. In their extension from the rim, they are carefully shaped to capture and contain the lens within the rim and thence, i.e. by reverse bending, extend laterally of the supporting system for ultimately receiving the iris diaphragm therebetween when both anterior and posterior clips are provided.

The irido-capsular system, having posterior clips only, is positioned with its clips located in the irido-capsular cleft. In either case, final fixation and centering of the pseudophakos is effected by the action of the iris sphincter muscle on the lateral clips.

The aforesaid supporting system is of an uniquely simple construction, easily and economically fabricated and readily applicable to implantable lenses formed of either plastic or ceramic without drilling, grooving or otherwise modifying the lenses.

Details of the invention will become more readily apparent from the following description when taken in conjunction with the accompanying drawings.

IN THE DRAWINGS

DESCRIPTION OF THE PREFERRED EMBODIMENTS

Figure 1:
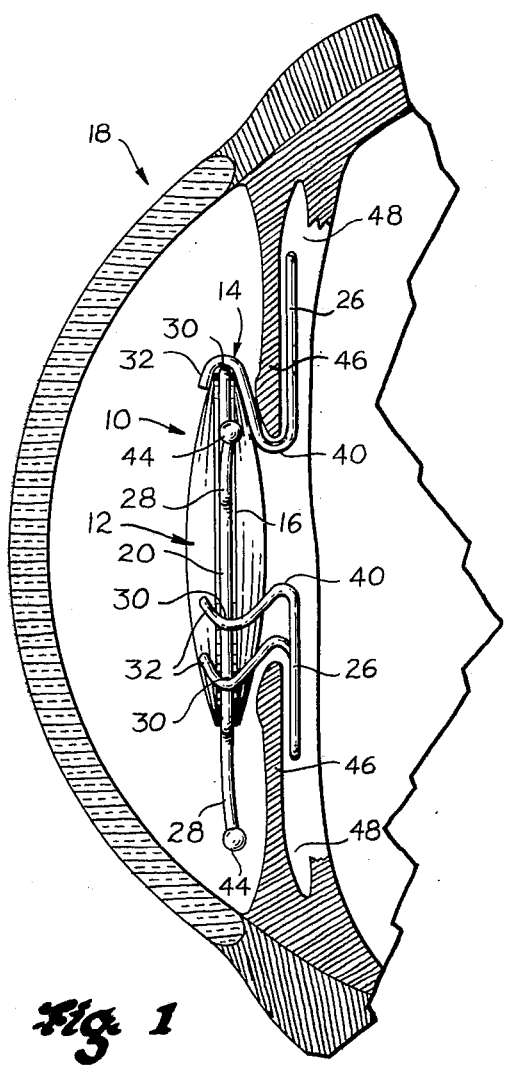
FIG. 1 is an illustration, in side elevation, of a preferred embodiment of a pseudophakos in situ, the eye being shown in cross-section for clarity of illustration.
Figure 9:
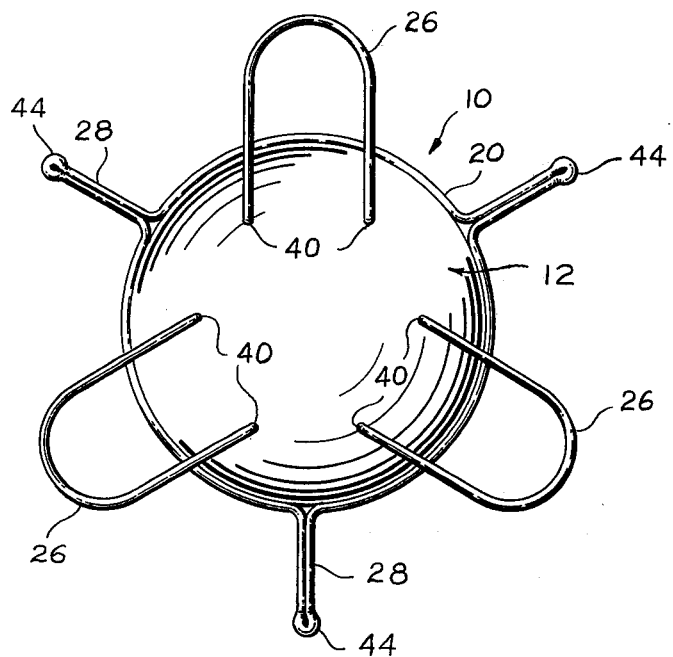
FIG. 9 is a view, in rear elevation, of the pseudophakos shown in FIG. 1.

Referring more particularly to FIGS. 1 and 9, pseudophakos 10 comprises an optical section (lens 12) and a fastening or haptic section (lens supporting system 14).

Lens 12 is formed of a material which is biologically inert, i.e. not susceptible to being absorbed by body fluids and capable of being well tolerated by the human body when implanted. Exemplary materials are quartz, ophthalmic glass, methyl methacrylate resins such as those available under the tradename "Lucite" and "Plexiglass" and biologically neutral, chemically pure polymethylmethacrylates or biologically inert polymeric materials.

Haptic section 14 is, for similar reasons of avoiding irritation and/or human body rejection of its components, formed of a biologically inert material such as platinum or titanium. While haptic section 14 will be described hereinafter as being formed of wire, it should be understood that strands or wirelike sections of biologically inert plastic materials may, alternatively, be used. Accordingly, the term "wire" as used throughout this specification and in appended claims is intended to include strands, strips or rods of biologically inert material whether the material is metallic or plastic and/or whether one or the other is used exclusively throughout section 14 or section 14 is comprised of combinations thereof.

Figure 6:
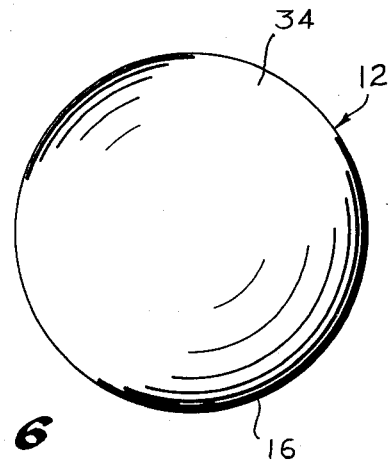
FIG. 6 is a view, in front elevation, of one form of implantable lens contemplated for use according to the invention.
Figure 7:
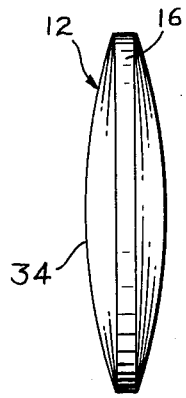
FIG. 7 is a side view of the lens depicted in FIG. 6.
Figure 8:
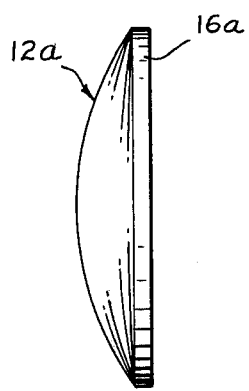
FIG. 8 is a side view of a modified form of implantable lens also contemplated for use according to the invention.

The two main sections 12 and 14 of pseudophakos 10 (FIGS. 1 and 9) are shown separately, i.e. disassembled, in FIGS. 2, 3, 6 and 7 for clearer illustration of their respective structural details. In this respect, it can be seen in FIGS. 6 and 7 that the optical section (lens 12) is provided with a flat edge 16. Lens 12, whether of the biconvex type as shown in FIGS. 6 and 7 or plano convex, e.g. lens 12a (FIG. 8), is supported for implantation in eye 18 (FIG. 1) by rim 20 of supporting (haptic) section 14.

Figure 4:
FIGS. 4 and 5 are views similar to that of FIG. 3 wherewith modifications in shape of the cross-section 3—3 are illustrated.
Figure 5:

Rim 20 may be circular in cross-section (FIG. 3) or generally semi-circular as shown in FIG. 4 or internally channelled, e.g. as in FIG. 5. In the latter cases, the flat surface 22 and channel 24 of FIGS. 4 and 5 respectively are intended to seat against flat edge 16 of lens 12 or the similar edge 16a of lens 12a, whichever combination of lens (optic section) and supporting system (haptic section) is used. The edge of lens 12 may be beveled if desired and rim 20 provided with a receiving V-shaped groove in place of channel 24 of FIG. 5.

In addition to rim 20 which supports lens 12, section 14 of the pseudophakos of FIGS. 1–9 includes posterior clips 26 and anterior iris clips 28.

Clips 26 each comprise a loop of wire microwelded, fused, soldered, braised or otherwise permanently fixed to rim 20 adjacent points 30 (FIG. 1). The terms "connected" or "connections" will be used hereinafter with reference to the fastening together of parts of lens supporting section 14, it being understood that this terminology is intended to cover the use of the aforementioned and/or any and all techniques deemed practicable for such purpose whether the rim 20 and iris clips 26, 28 are formed entirely of metal or of plastic or partially of each.

Ends 32 (FIG. 1) of posterior clips 26 are so shaped in their extensions from respective connections 30 as to fit intimately against the anterior surface 34 of lens 12 in the final assembly of the pseudophakos. These ends 32 prevent forward displacement of lens 12.

Rearwardly from connections 30, the loop of each iris clip 26 is shaped to fit intimately against the posterior surface of lens 12 for a substantial distance inwardly of surface 34. This prevents rearward displacement of lens 12 in the final assembly. At a radial distance from the center of lens 12 which is less than the diameter of the pupil 38 of eye 18, clips 26 are reversely bent (e.g. at bight 40) to extend the clips posteriorly and laterally away from lens 12.

Anterior iris clips 28 in the case of the FIGS. 1–9 embodiment of the invention are in the form of rods made up of juxtapositioned sections of the length of rim 20.

In the illustrated example of this embodiment of the invention, rim 20 comprises a single length of wire wherein two of clips 28 are formed by tightly reversely bending portions of the rim while the third clip 28 is made up of extensions 42 of the two opposite ends of rim 20.

Figure 2:
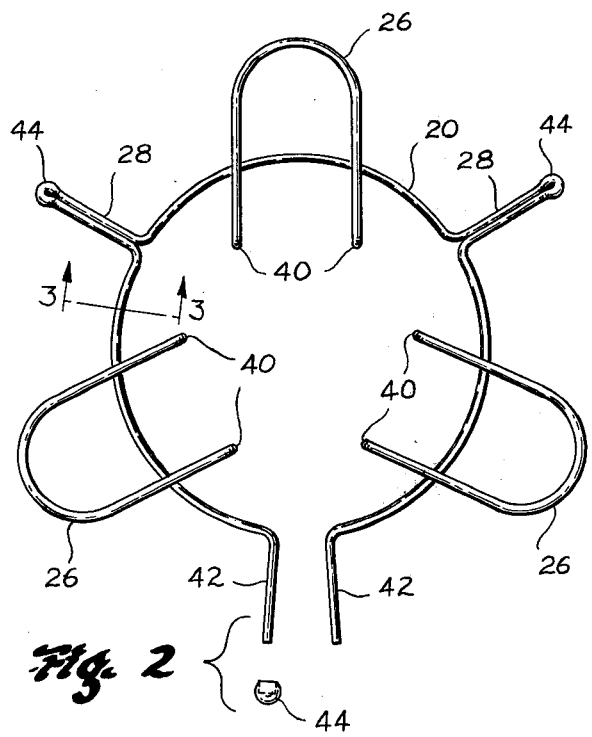
FIG. 2 is a rear elevational view of the haptic section of the pseudophakos shown in a partially assembled condition.
Figure 3:
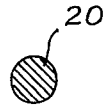
FIG. 3 is an enlarged cross-sectional view taken along line 3—3 of FIG. 2.

With extensions 42 of rim 20 initially unconnected and separated, e.g. as shown in FIG. 2, insertion of lens 12 into rim 20 is facilitated. Thereafter, juxtapositioning of extensions 42 closes rim 20 tightly about lens 12 as shown in FIG. 9. Connecting these extensions together completes the structural integrity of pseudophakos 10.

The rod-like clips 28 are preferably provided with smoothly rounded or spherically shaped termini 44.

Such a terminus in each case may be separately formed as part 44 (FIG. 2) fitted over the ends of clips 28 and welded or otherwise permanently connected thereto or it may be formed of the material of rim 20 by localized application of heat sufficient to melt and cause balling of the rim material.

The thus completed pseudophakos is positioned in the anterior chamber of eye 18 with its anterior iris clips 28 disposed forwardly of the iris diaphragm (FIG. 1) and its posterior clips 26 extended through pupil 28 into the irido-capsular cleft 48.

Exemplary and useful, but not necessarily restrictive, dimensional parameters are:

Optical Section (lens 12)
1. diameter = 4 to 5 mm
2. equivalent power in aqueous = approximately 20 diopters Haptic Section (lens supporting system 14)
1. diameter of rim and iris clip wire = from approximately 0.1 to 0.5 mm
2. clearance between anterior and posterior clips = from approximately 0.5 to 0.75 mm, i.e. just enough to allow the iris diaphragm to fit relatively easily therebetween
3. the maximum radial distance from center of the lens to tip of iris clips = approximately 9 mm It should be understood that the number of iris clips 28 and/or 26 used and their shapes, sizes or positional locations about rim 20 may be varied in accordance with the type of surgical procedure contemplated for implantation of the pseudophakos and peculiarities, if any, of the receiving eye and/or preferances of the surgeon.

Figure 10:
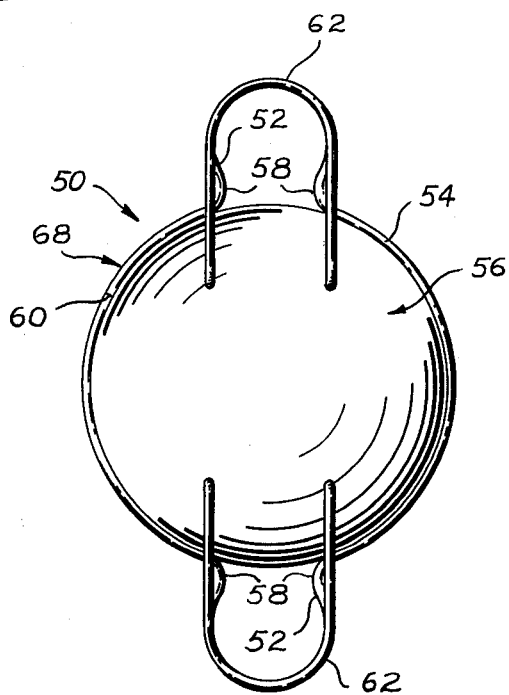
FIG. 10 is a view, in rear elevation, of a modified pseudophakos.
Figures 11, 12:
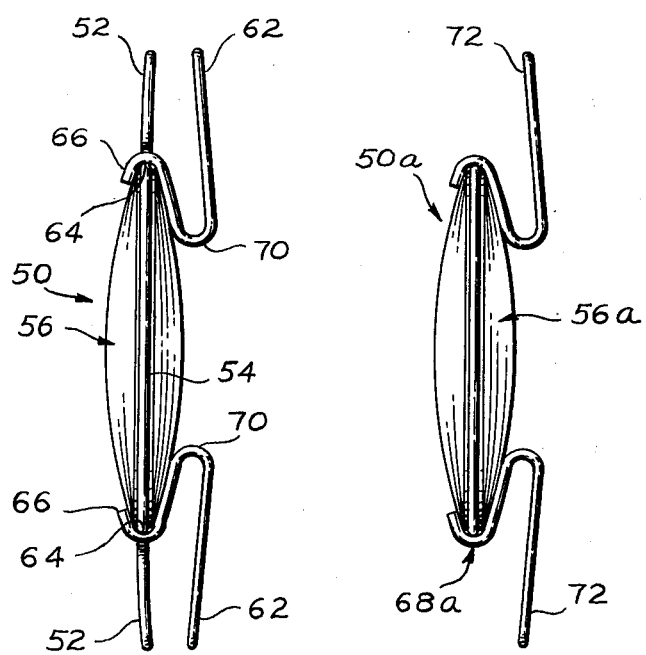
FIG. 11 is a side elevational view of the device of FIG. 10.
FIG. 12 is a view, in side elevation, of a differently modified pseudophakos.

A modification of the invention employing only diametrally opposed pairs of posterior and anterior iris clips, each in the form of a wire lamp, is shown in FIGS. 10 and 11. This pseudophakos 50 has its anterior iris clips 52 formed of sections of the length of lens rim 54. The extension of rim 54 about lens 56 is interrupted at diametrically opposite sides of the lens by bends 58 directing the rim outwardly laterally of lens 56 into the form of loops. The smoothly outwardly rounded bight of these loops forms clips 52.

Rim 54 is tightly fitted to lens 56 and preferably rendered endless in its extension thereabout by butt fusion of its opposite ends at any point therealong, e.g. point 60 (FIG. 10).

Posterior clips 62, in the case of this illustration, are similar in shape to clips 26 of pseudophakos 10 and are preferably similarly connected to rim 54 at points 64 (FIG. 11). The forwardly directed ends 66 of clips 62 prevent forward displacement of lens 56 in its haptic section (lens supporting system 68) while reversely bent sections 70 prevent rearward displacement of lens 56. Sections 70 also space clips 52 from clips 62 for subsequent reception of the iris diaphragm.

Pseudophakoi 10 and 50, in having both posterior and anterior iris clips, are intended to receive the iris diaphragm 46 of an eye therebetween. These pseudophakoi have been referred to in the field of ophthalmology as "iris clip lenses". A pseudophakos of another well-known type called an "iridicapsular lens" is, however, also contemplated according to the invention. This pseudophakos is provided with posterior iris clips only. An exemplary lens 68a having only posterior clips 72 as shown in FIG. 12.

As it can be seen from the foregoing description and accompanying drawings, pseudophakoi 10, 50 and 50a of FIGS. 1–9, 10–11 and 12 are designed so as to position their respective lenses 12, 56 and 56a in the anterior chamber of the eye, i.e. forwardly of its iris. It should be appreciated, however, that anterior clips only, such as clips 52 of pseudophakos 50, may be used for this purpose if the surgeon wishes to leave the iris diaphragm free by seating these clips in the anterior cleft of the iris. This technique is illustrated in U.S. Pat. No. 2,834,023.

Still another technique for implanting pseudophakoi involves placement of the lens in the posterior chamber of the eye. This can be accomplished by inverting the haptic section 68a of pseudophakos 50a of FIG. 12 so that its side having clips 72 becomes its anterior side. Thus, the placement of clips 72 in the irido-capsular cleft will locate lens 56a in the posterior chamber.

The shapes, sizes, radial locations and actual numbers of anterior and/or posterior clips used in any one or combinations of parts of the pseudophakoi described hereinabove may be preselected according to particular needs of the surgeon and/or physical requirements of the recipient eye. In all cases, however, the present invention features a lens supporting system comprised of a lens rim extending about at least the major portion of the periphery of the lens and from which iris clips are extended. The artificial intraocular lens is supported without the need for drilling, grooving or other such modification.

The lens rim may, if desired, be disposed either against the posterior or anterior surface of the lens adjacent to its edge, rather than being seated directly upon the lens edge as has been illustrated. Thus, it is to be understood that reference which may be made in appended claims to the "periphery" of a lens is intended to include portions of its opposite surfaces adjacent to its edge as well as the edge itself.

It is also pointed out that the invention contemplates constructing entire lens supporting systems of a single length of wire by bending to the desired shape in cases where design parameters make such construction practicable.

We claim:

1. A supporting system for an artificial intraocular lens comprising:
    a rim adapted to extend about at least the major portion of the periphery of a lens to be supported by said system; and
    at least one integral iris clip extending away from said rim, said clip including a portion adapted to partially overly at least one surface of said lens for preventing displacement thereof from said rim in a final assembly of said lens and supporting system.

2. A supporting system according to claim 1 including a plurality of iris clips, at least one of which comprises a loop of wire.

3. A supporting system according to claim 1 including a plurality of iris clips, at least one of which is in the configuration of a rod extending away from said iris.

4. A supporting system according to claim 1 including at least one posterior iris clip and at least one anterior iris clip.

5. A supporting system according to claim 4 wherein said posterior and anterior iris clips are each in the form of a loop of wire.

6. A supporting system according to claim 4 wherein said posterior iris clip is in the form of a loop of wire and said anterior iris clip is in the configuration of a rod extending away from said rim.

7. The combination of an artificial intraocular lens and supporting system therefore comprising:
    a rim extended about at least the major portion of the periphery of said lens; and
    at least one integral iris clip extending away from said rim, said clip including a section partially overlying one surface of said lens for preventing displacement thereof from said rim.

8. The combination according to claim 7 including a plurality of iris clips, at least one of which comprises a loop of wire.

9. The combination according to claim 7 including a plurality of iris clips, at least one of which is in the configuration of a rod extending away from said rim.

10. The combination according to claim 7 including at least one posterior iris clip and at least one anterior iris clip.

11. The combination according to claim 10 wherein said posterior and anterior iris clips are each in the form of a loop of wire.

12. The combination according to claim 10 wherein said posterior iris clip is in the form of a loop of wire and said anterior iris clip is in the configuration of a rod extending away from said rim.

* * * * *